(12) United States Patent
Powers

(10) Patent No.: US 7,882,639 B2
(45) Date of Patent: Feb. 8, 2011

(54) BRAZE REPAIR OF SHROUD BLOCK SEAL TEETH IN A GAS TURBINE ENGINE

(75) Inventor: John Matthew Powers, Independence, KY (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 12/048,672

(22) Filed: Mar. 14, 2008

(65) Prior Publication Data
US 2008/0209726 A1 Sep. 4, 2008

Related U.S. Application Data

(62) Division of application No. 10/869,344, filed on Jun. 14, 2004, now Pat. No. 7,363,707.

(51) Int. Cl.
*B23P 6/00* (2006.01)
(52) U.S. Cl. ....................................... 29/898.1
(58) Field of Classification Search ................ 29/889.1, 29/889.21, 402.03, 402.08, 402.11, 402.13; 415/209.3; 228/219, 216, 245; 164/92.1, 164/80
See application file for complete search history.

(56) References Cited

U.S. PATENT DOCUMENTS

| 3,771,798 A | 11/1973 | McDonald et al. |
| 3,846,899 A | 11/1974 | Gross |
| 6,464,128 B1 | 10/2002 | Messelling et al. |

*Primary Examiner*—John C Hong
(74) *Attorney, Agent, or Firm*—McNees Wallace & Nurick

(57) ABSTRACT

An undersize repair region of a gas turbine engine stationary shroud is repaired with a sufficient mass of a repair material. The repair region includes a protruding portion that is undersized, and the repair includes machining of the protruding portion, grooving the resulting rub surface, inserting a replacement element, applying a brazing repair material, and brazing the article to form a repaired article. The repair material preferably includes a first fraction of a first powder of a first alloy component, and a second fraction of a second powder of a second alloy component. The first alloy component and the second alloy component have different solidus temperatures. The repair material is placed in the repair region. The repair material and the repair region are heated to melt the repair material but not the repair region, and thereafter the repair material and the repair region are cooled to solidify the repair material.

18 Claims, 3 Drawing Sheets

BRAZE REPAIR OF SHROUD BLOCK SEAL TEETH IN A GAS TURBINE ENGINE

CROSS REFERENCE TO RELATED APPLICATION

This application is a divisional of U.S. Utility application Ser. No. 10/869,344, filed Jun. 14, 2004, entitled "BRAZE REPAIR OF SHROUD BLOCK SEAL TEETH IN A GAS TURBINE ENGINE", which is incorporated herein by reference in its entirety.

FIELD OF THE INVENTION

This invention relates to gas turbine engines and, more particularly, to the repair of stationary shrouds found in gas turbine engines.

BACKGROUND OF THE INVENTION

In a gas turbine engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor. In aircraft applications, the hot exhaust gases flow from the back of the engine, driving the aircraft forwardly.

The turbine blades are mounted on a turbine disk, which rotates on a shaft inside a generally cylindrical tunnel defined by a hollow stationary shroud structure. The stationary shroud structure is formed of a series of stationary shrouds that extend around the circumference of the tunnel in an end-to-end fashion. The stationary shroud structure has such a segmented arrangement to accommodate the thermal expansion experienced during each engine cycle as the stationary shroud structure is cycled between room temperature and a maximum service temperature of over 2000 degrees F. Each of the stationary shrouds has an internal gas path surface that is a segment of a cylinder, and a support structure that backs the gas path surface and provides for attachment to the adjacent structure. Additionally, in power generation applications, the gas path surface of the shrouds includes shroud block seal teeth that protrude from the shroud path surface. During turbine operation, the shroud block seal teeth act as a seal to minimize the escape of gas between the turbine blade and the shroud gas path surface.

During service, the shroud and the shroud seal teeth may be damaged by fatigue, erosion, and other mechanisms. One form of the damage is the wearing away of material from the shrouds, at locations such as the end faces, the forward and aft edges, shroud teeth, and elsewhere. As material is worn away and during multiple repair cycles when material is removed by machining operations, the shroud gradually becomes undersize in at least one dimension of the support structure and can provide a potential leak path for gas. When the shroud has become too small in at least one dimension of the support structure to continue to be functional, it is discarded.

There is a need for an improved approach to responding to damage to gas turbine engine shrouds, and particularly to protruding structures on the gas path face such as seal teeth. The shrouds are made of expensive nickel-base or cobalt-base superalloys, and the discarding of a shroud represents a substantial cost. The present invention fulfills this need, and further provides related advantages.

SUMMARY OF THE INVENTION

The present invention provides a method of repairing a protruding structure on a stationary shroud a gas turbine engine assembly. The repair may be performed on any portions of the shroud structure. It is preferably performed on the seal teeth which protrude from the shroud gas path face that faces the turbine blade tips in service, and gradually become undersized, chipped, or otherwise damaged. The repaired shroud is fully functional and is serviceable at a fraction of the cost of a new shroud.

A method of repairing a gas turbine engine stationary shroud comprises the steps of providing the gas turbine engine stationary shroud having an undersize repair region made of a shroud material, wherein the repair region is located on a gas flow path surface of the gas turbine engine stationary shroud. The repair region can include, for example, a protruding element such as an individual seal tooth, or a series of individual seal teeth, as well as the point of attachment of the base of the protruding element to the gas flow path surface. The repair region of the gas turbine engine stationary shroud is repaired so that the repair region is no longer undersize.

The step of repairing includes the steps of machining at least one protruding element to be flush with the non-protruding gas path surface of the shroud, cutting a receiving groove or slot into the shroud gas path surface, providing a replacement element and inserting the replacement element into the receiving groove, and fixedly securing the replacement element by brazing. Preferably, the step of repairing further includes the step of placing brazing material into the receiving groove, and optionally also on the base of the protruding element and the flow path face of the repair region. The step of brazing further includes the steps of heating the repair material and the repair region to a brazing temperature sufficient to melt the repair material but not the replacement element or the shroud material of the repair region, so that the repair material flows over the repair region to contact the replacement element and the shroud, and thereafter cooling the melted repair material and the repair region to solidify the repair material. Additionally, the step of repairing can further include machining of the repaired shroud to restore desired dimensions.

The shroud material may be comprised of any metal or alloy suitable for use in the high-temperature, highly oxidative environment of a gas turbine, including, but not limited to stainless steel, cobalt-base superalloys or a nickel-base superalloys, and the replacement element is also preferably comprised of at least one of these materials. The braze repair material is selected accordingly, and has a solidus temperature less than that of the materials comprising the shroud and replacement element.

The present approach achieves a fully serviceable repaired shroud, reducing the number of shrouds that are discarded. The scope of the invention is not, however, limited to this preferred embodiment. Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
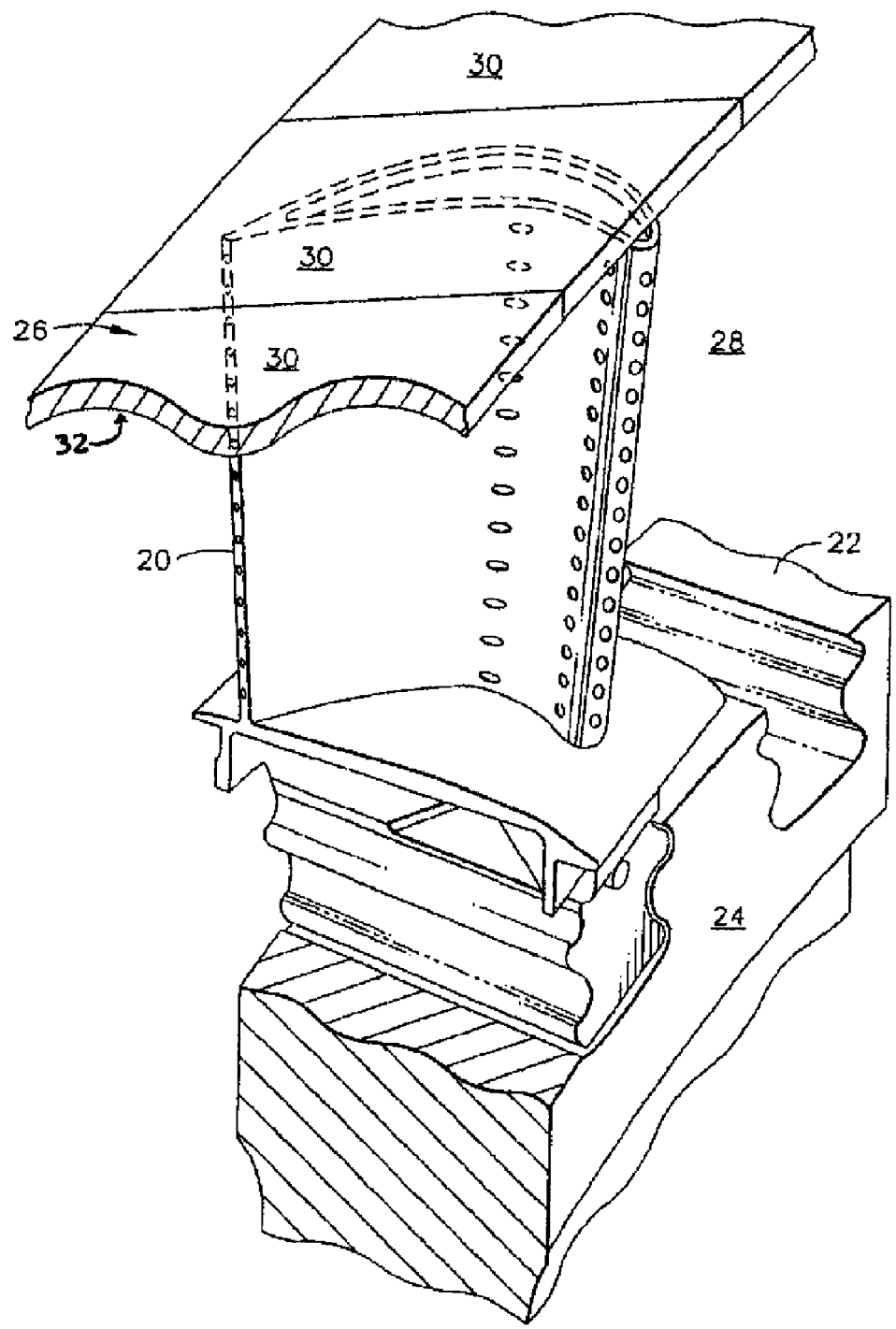
FIG. 1 is a perspective view of a turbine blade positioned adjacent to a shroud structure having protruding elements comprised of seal teeth.

FIG. 1 depicts a turbine blade 20 mounted to a periphery 22 of a turbine disk 24. There are a large number of turbine blades 20 mounted in this fashion to the turbine disk 24, but only one is illustrated. The turbine disk 24 rotates on a turbine shaft (not shown) positioned along its centerline. As the turbine disk 24 rotates, the turbine blade 20 sweeps through an annular volume between the turbine disk 24 and a stationary shroud structure 26, a portion of the circumference of which is shown schematically in FIG. 1 and in more detail in FIG. 2. The shroud structure 26 in its entirety defines a tunnel 28 in which the turbine disk 24, turbine shaft, and turbine blades 20 rotate. Hot combustion gases flow from a combustor (not shown) through the annular volume of the tunnel 28 between the periphery 22 of the turbine disk 24 and the shroud structure 26, impinging against the turbine blades 20 and causing the turbine disk 24 and the shaft to turn.

The shroud structure 26 is formed of a number of individual shrouds 30 positioned in an end-to-end arrangement around the circumference of the blade tips to form a tunnel 28. One of the shrouds 30 is shown in greater detail in FIG. 2. The shroud 30 has a gas flow path surface 32 that faces the turbine blade 20. The shroud further includes at least one protruding portion, such as one or more shroud seal teeth 33, provided on or attached to the shroud gas flow path surface 32 of the shroud 30. Seal teeth 33 are typically arranged circumferentially around the gas flow path tunnel 28 formed by the shroud structure 26. Additional structural features, whose details and functions are not pertinent to the present invention, can include oppositely disposed end faces that abut the end faces of any adjoining shrouds, an oppositely disposed forward edge and aft edge, a back side that is opposite the flowpath face 32, and other common shroud features.

During service, one or more of the protruding features of the shroud 30, such as the seal teeth 33, may become damaged by removal of material, so that the feature becomes undersized. For example, the seal teeth 33 provided on the gas flow path surface 32 may become worn, or may chip or otherwise become damaged by contact with the turbine blade 20, foreign objects, or simply from the force and heat of passing gasses. Initially, some such damage is acceptable, but eventually the feature is reduced in size so far below its desired specified service minimum dimension that it is no longer functional. In the past, it has been the practice to discard the entire shroud 30 at this point. The present invention provides a repair technique for the seal teeth 33 of the shroud 30 so that the shroud 30 may be removed from the engine, repaired, and then returned to service.

Figure 2:
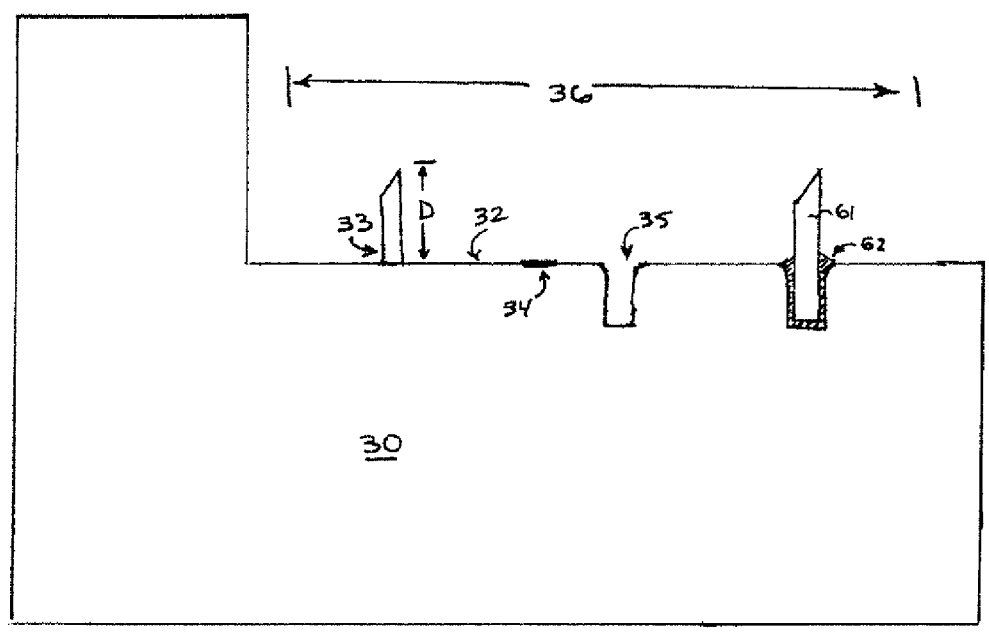
FIG. 2 is an enlarged cross-sectional view of the shroud of FIG. 1.

FIG. 2 illustrates a gas turbine engine stationary shroud 30. The shroud 30 has a repair region that is undersize. That is, some dimension of the shroud 30 is less than a specified service minimum dimension. The current repair region of most concern is loss of material from the seal teeth 33 that protrude from the gas flow path surface 32 since this region of the shroud experiences the greatest wear. As illustrated in FIG. 2, a specified service minimum dimension D, the protruding height of the seal tooth 33, is indicative of the total protruding length of the seal tooth 33 as measured from the gas flow path surface 32 in contact with the base of the seal tooth 33. If D is too small, the shroud seal tooth 33 will be too short, and will not provide a proper seal between the shroud 30 and the turbine blade, allowing turbine gas leakage between the shroud 30 and the turbine blade 20 and a resulting decrease in operating efficiency.

FIG. 2 shows seal teeth 33 in various states of repair in accordance with the present invention. For example, an intact seal tooth 33 of a new-make shroud, for example, is illustrated, a rub surface of the shroud 34 is shown, as well as a groove 35 for receiving a replacement element 61 (here shown as a spad seal tooth). The shroud 30 and its repair region, in this case the repair region 36 that includes the protruding seal teeth 33 and the surrounding gas flow surface 32, are repaired by a technique involving removing, such as by machining away, the protruding seal teeth 33 to the non-protruding rub surface 34, cutting a receiving groove 35 below surface 32 in the gas flow path surface 32, inserting a replacement element 61 into the receiving groove 35, and permanently affixing the replacement element 61 to the groove 35 and the surrounding gas flow path surface 32 using a repair material 62. Preferably, the replacement element 61, here a spad tooth, includes a first protruding end and a second opposite end configured for insertion into the groove 35. More preferably, the groove 35 includes a bottom wall configured to securely receive the second end of the replacement element 61, and can also include flanged sidewalls to allow repair material to flow into any space between the walls of the groove 35 and the replacement element 61 and the adjacent flow path surface 32 during brazing. Most preferably, the flow path surface 32 of the shroud 30 and repair element 61 are made from the same material so as to ensure predictable resistance to damage during brazing, and to ensure substantially uniform contact and adhesion properties in combination with the selected repair material 62 after brazing.

Figure 3:
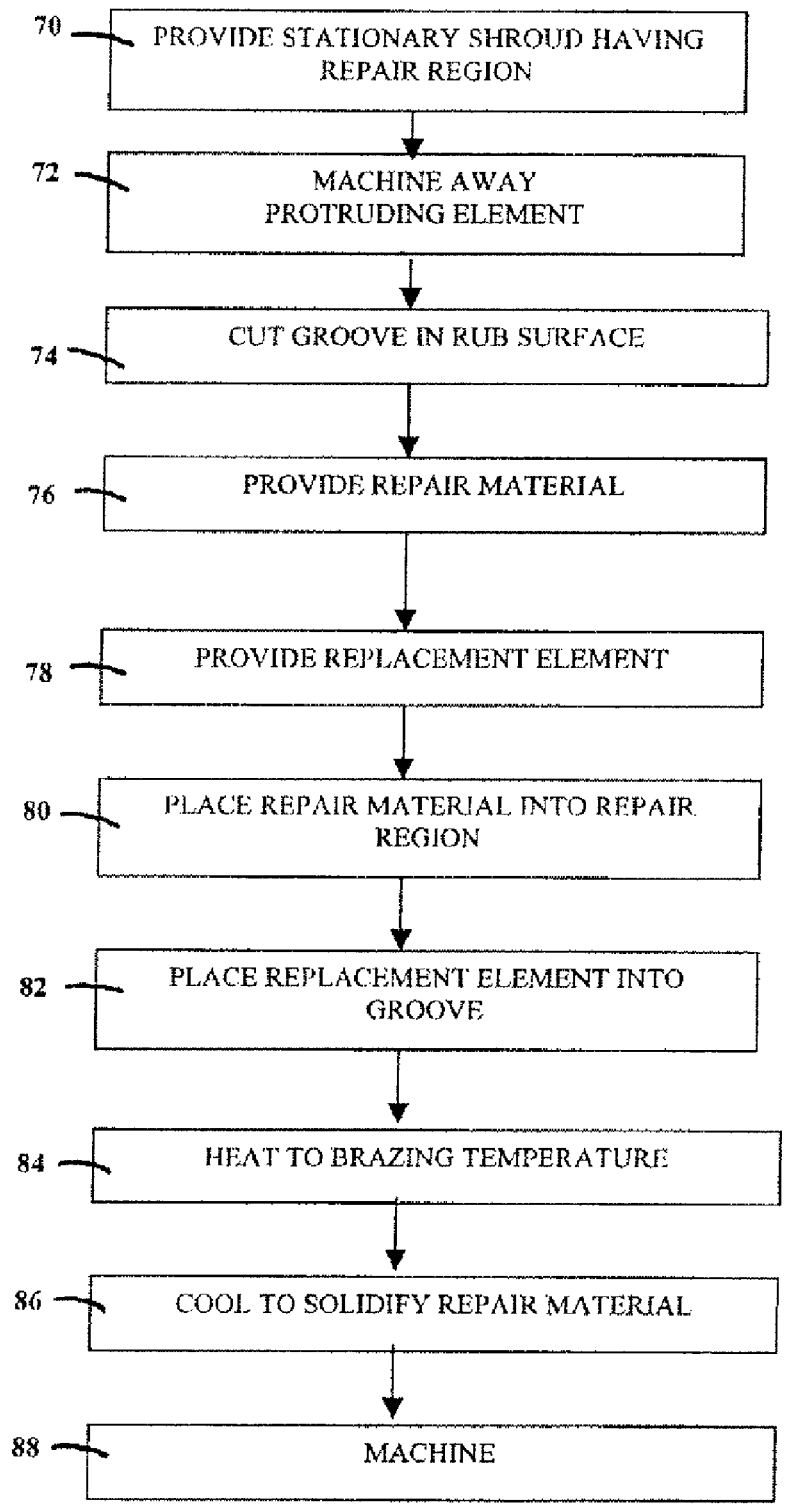
FIG. 3 is a block flow diagram of one embodiment of the methods of the present invention.

In the particular method of FIG. 3, the repair method includes the step 70 of providing a stationary shroud 30 having a repair region 36. The repair region includes at least one protruding element having a dimension less than a specified service minimum dimension, such as a seal tooth 33. In step 72, the protruding element is removed to produce a rub surface 34 that is substantially coplanar with the gas flow path surface 32. In step 74, a groove is cut into the flow path surface 32, preferably at the location of the rub surface 34 where the protruding element 33 was formerly located. Steps 72 and 74 can be performed as a single operation, if desired. In steps 76 and 78, respectively, a repair material 62 and a replacement element are provided. In step 80, the braze repair material is placed into the repair region 36 in proximity to the groove 35. In step 82, a replacement element such as a seal tooth 33, is placed into the groove 35. In step 84, the repair region is heated to a brazing temperature, wherein at least a portion of the braze repair material 62 is melted and contacts the flow path surface 32 and the replacement element 61, and preferably the walls of the groove 35. Some braze material may be located in groove 35. However, this is not fundamentally necessary if the tooth 33 is fitted into groove 35 so that there is a space between the walls of groove 35 and surfaces of tooth 33. In this circumstance, the molten braze material will flow into the space by capillary action. In step numeral 86, the repair region 36 is allowed to cool, thereby solidifying the brazed repair material 62 to securely adhere the replacement element 61 to the shroud 30. Optionally, the method further includes the additional step numeral 88 of machining the repair region, including the repair material 62 and replacement element 61, to restore dimensions appropriate for service in the gas turbine engine.

The repair material 62 is a braze material that is selected to be compatible with the material of the shroud 30 and the replacement element 61. The brazing material can be provided in the form of wire, rod, strip, foil, powder, and/or a viscous mixture (paste) including powder in a suitable binder. Where the shroud 30 and/or replacement element are comprised of stainless steel, the repair material 62 is preferably a nickel alloy brazing material. More preferably, the shroud is made of 310 stainless steel or 410 stainless steel, and the brazing material is a nickel alloy brazing filler. Most preferably, the brazing filler is comprised of about 82% Ni, 4.5% Si, 7.0% Cr 3.1% B, 3.0% Fe, and characterized by a solidus-liquidus range of between about 1780 to about 1830° F. (about 971 to about 999° C.). An exemplary nickel alloy brazing material having these properties is SAE AMS4777F, as specified, described and published by the Society of Automotive Engineers, Inc. of Warrendale, Pa., USA. However, other nickel alloy brazing materials can be utilized. In this embodiment, the preferred nickel alloy brazing material is capable of joining nonferrous alloys and corrosion and heat resistant steels and alloys, and displays low flow point and corrosion and oxidation resistant joints with good strength at elevated temperatures. A further benefit of the preferred nickel alloy brazing material is that it provides a corrosion and oxidation resistant hard coating that can be smoothed and otherwise worked to yield a smooth repair area on turbine engine components that are routinely exposed to high operating temperatures. Because the braze material includes Boron, an element that diffuses very rapidly, and Si, an element that diffuses quickly (but not as quickly as Boron), these elements, which contribute to the solidus temperature of the braze material being lower than the materials being joined, will rapidly diffuse from the braze material upon high temperature exposure, thereby raising the solidus temperature of the braze material.

Alternatively, where the material comprising the shroud and/or repair element 61 is an alloy, such as a cobalt-based superalloy or a nickel-based superalloy, an appropriate repair material 62 can be selected according to the alloy material. Appropriate braze materials and methods for such alloys are disclosed in commonly owned U.S. Pat. No. 6,464,128, which is hereby incorporated by reference. For example, in one embodiment, the repair material 62 is a braze material comprising a powder of a first alloy component and a powder of a second alloy component, each component having different solidus temperatures. The repair material that is later formed as a melted mixture of the first powder and the second powder has a solidus temperature less than that of a shroud material that forms the repair region 36. In this embodiment, the first powder and the second powder are selected according to the shroud material that forms the repair region, as well as the material that forms the replacement element 61, such as a spad seal tooth 33. The powders selected for cobalt-base shroud materials are different from those selected for nickel-base shroud materials. In a case of particular interest, the shroud material is a cobalt-base alloy known as Mar M509, which has a nominal composition, in weight percent, comprising about 23.5 percent chromium, about 10 weight percent nickel, about 7 percent tungsten, about 3.5 percent tantalum, about 0.2 percent titanium, about 0.4 percent zirconium, about 0.6 percent carbon, no more than about 2 percent iron, the balance cobalt and impurities. Additionally, the braze repair material can include melt-depressants such as Boron and Silicon.

For cobalt-base shroud and replacement element material, the first alloy component of the repair material 62 preferably comprises a prealloyed composition, in weight percent, of from about 10 to about 25 percent nickel, from about 15 to about 25 percent chromium, from about 5 to about 10 percent silicon, from about 2 to about 6 percent tungsten, from about 0.2 to about 0.8 percent carbon, from about 0.4 to about 2.0 percent boron, balance cobalt and impurities. The second alloy component preferably comprises a prealloyed composition, in weight percent of from about 5 to about 15 percent nickel, from about 15 to about 30 percent chromium, about 2.0 percent maximum silicon, from about 5 to about 10 percent tungsten, from about 0.3 to about 0.8 percent carbon, about 1.5 percent maximum manganese, about 3 percent maximum iron, about 0.5 percent maximum zirconium, balance cobalt and impurities. The first fraction is preferably from about 25 weight percent to about 50 weight percent, most preferably about 35 weight percent. The second fraction is preferably from about 75 weight percent to about 50 weight percent, most preferably about 65 weight percent.

On the other hand, the shroud 30 and replacement element 61 can be include a nickel-base superalloy such as Rene N5, which has a nominal composition, in weight percent, of from about 6 to about 6.4 percent aluminum, from about 6.75 to about 7.25 percent chromium, from about 7 to about 8 percent cobalt, from about 0.12 to about 0.18 percent hafnium, from about 1.3 to about 1.7 percent molybdenum, from about 2.75 to about 3.25 percent rhenium, from about 6.3 to about 6.7 percent tantalum, from about 4.75 to about 5.25 percent tungsten, a sum of aluminum plus tantalum about 12.45 percent minimum, balance nickel and impurities. Where the shroud material is a nickel-base superalloy such as Rene N5, the first alloy component preferably comprises a prealloyed composition, in weight percent, of from about 10 to about 20 percent cobalt, from about 14 to about 25 percent chromium, from about 2 to about 12 percent aluminum, from 0 to about 0.2 percent yttrium, balance nickel and impurities. The second alloy component preferably comprises a prealloyed composition, in weight percent of from about 10 to about 20 percent cobalt, from about 14 to about 25 percent chromium, from about 2 to about 12 percent aluminum, from about 2 to about 12 percent silicon, balance nickel and impurities. The first fraction is preferably from about 55 to about 80 weight percent, most preferably about 68.5 weight percent. The second fraction is preferably from about 45 weight percent to about 20 weight percent, most preferably about 31.5 weight percent.

Where the repair material 62 is comprised of two types of individually prealloyed powders, the powders may be provided in a loose, free-flowing form. Alternatively, they may instead be provided as an unsintered compact or a pre-sintered compact. Both approaches are operable, although the use of the pre-sintered compact can be more practical for production operations. In this latter approach, the powders are mixed together, pressed with a binder into a desired shape before applying to the repair region. Optionally, to form a pre-sinter, the mixed powders can be pre-sintered by heating to a temperature where the powders are slightly sintered together to form a compact. It is not necessary that either compact have a high relative density (that is, little porosity), as it is later fully melted. The compacts are more easily handled and positioned than are the free-flowing powders, and there is less compaction and shrinkage in subsequent melting. A combination of these approaches may be desired. For example, a compact may be contacted to the flow path surface 32, and free-flowing powders may be packed into the groove 35.

The braze repair material 62 is placed into the repair region 36. The repair material 62 may be the mixture of the free-flowing powders, the compact, or a combination of both. The amount of braze repair material 62 is preferably selected so that, after subsequent melting and machining, the gas flow path surface 32, the replacement element 61, and the rest of the repair region is restored to approximate a predetermined desired service dimension. However, machining can be performed as an additional step to impart and restore desired dimensions of the surface 32, replacement element 61, and other features within the repair region 36 if desired.

The replacement element 61 is placed in the groove 35, and the repair material 62 within the repair region 36 is heated to a brazing temperature to melt at least a portion of the repair material but not the shroud material or replacement element 61 of the repair region. The braze repair material 62 should always be selected so that its melting temperature is below both that of the replacement element 61 and shroud base material 30. In the case of the above-discussed preferred repair material for stainless steel shrouds 30 and replacement elements 61, the brazing temperature is between about 1780 degrees F. to about 1830 degrees F. However, the brazing temperature can be varied between about 1400 and about 2200 degrees F. based on parameters of the particular repair, including mass, configuration, and application.

Where the shroud 30 and replacement element 61 are comprised of cobalt-base alloys or the nickel-base alloys, the brazing temperature is from about 2190 degrees F. to about 2335 degrees F., and preferably from about 2300 degrees F. to about 2325 degrees F. However, the brazing temperature range can be further varied based on parameters of the particular repair, including mass, configuration, and application. In embodiments wherein the repair material includes two alloy powders, at the brazing temperature, the powder having the lower solidus temperature melts to accelerate the bonding to the shroud 30 and replacement element 61 and the densification process, while the powder having the higher solidus temperature remains solid so that the powder mass generally retains its shape.

The brazing is preferably performed in a vacuum furnace. The brazing time, defined as the period of time at which the repair region 36 is maintained at a temperature sufficient to braze the repair material 61, can also be varied based on parameters of the particular repair, including mass, configuration, and application. For example, the brazing time is typically on the order of about 20 minutes to about 2 hours. More preferably, the brazing time is between about 1 hour to about 2 hours. After brazing, the repaired workpiece is braze cooled to solidify the repair material. The braze repair material solidifies, forming a metallurgical bond to the shroud 30 and the replacement element 61. The result is a repaired article having a replacement element 61 permanently affixed to the repair region of the shroud 30. In most cases, the amount of braze repair material is selected so that the repair region will be slightly oversize after the brazing and cooling steps. Although it would be desirable to make the repair exactly the right size after brazing and cooling, it is typically not possible to control the amount and distribution of the repair metal that precisely. Accordingly, the repair region can be made oversize, and then excess material machined away to achieve the correct size and with the necessary details to restore the repair region to operating tolerances.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A gas turbine engine stationary shroud repaired according to the method comprising the steps of:
   providing the gas turbine engine stationary shroud having an undersize repair region made of a shroud material, wherein the repair region is a protruding element located on a gas flow path surface of the gas turbine engine stationary shroud;
   repairing the repair region of the gas turbine engine stationary shroud so that the repair region is no longer undersize, further including the steps of:
   removing the protruding element from the shroud;
   forming a receiving groove in the repair region, the groove extending below the gas flow path surface;
   placing a replacement element into the receiving groove;
   placing a braze repair material in the repair region, the braze repair material having a solidus temperature less than that of the shroud material;
   heating the repair region, the replacement element, and the repair material to a brazing temperature sufficient to melt at least a portion of the braze repair material but not the replacement element or shroud material of the repair region, so that the repair material flows over the repair region, into the groove, contacting the replacement element and the gas flow surface; and thereafter
   cooling the melted braze repair material and the repair region to solidify the braze repair material;
   wherein the step of placing a repair material in the repair region includes placing the repair material in the receiving groove.

2. The shroud of claim 1, wherein the repair region has a protruding element dimension less than a specified service minimum dimension.

3. The shroud of claim 1, wherein the shroud material comprises stainless steel.

4. The shroud of claim 3, wherein the braze repair material comprising nickel, chromium, and iron and a melt depressant element.

5. The shroud of claim 4, wherein the braze repair material is comprised, in weight percent, of about 82 percent nickel, about 4.5 percent silicone, about 7.0 percent chromium, about 3.1 percent boron, and about 3.0 percent iron.

6. The shroud of claim 1, wherein the step of providing a gas turbine engine stationary shroud includes the step of providing a gas turbine engine stationary shroud wherein the shroud material comprises a cobalt-base alloy.

7. The shroud of claim 6, wherein the cobalt base alloy has a composition, in weight percent, comprising about 23.5 percent chromium, about 10 weight percent nickel, about 7 percent tungsten, about 3.5 percent tantalum, about 0.2 percent titanium, about 0.4 percent zirconium, about 0.6 percent carbon, no more than about 2 percent iron, balance cobalt and impurities.

8. The shroud of claim 7, wherein the braze repair material is comprised of a mixture of two alloy components, each comprising a weight fraction of the total braze material mixture and wherein
   the first alloy component comprises a prealloyed composition, in weight percent, of from about 10 to about 25 percent nickel, from about 15 to about 25 percent chromium, from about 5 to about 10 percent silicon, from about 2 to about 6 percent tungsten, from about 0.2 to about 0.8 percent carbon, from about 0.4 to about 2.0 percent boron, balance cobalt and impurities, and the second alloy component comprises a prealloyed composition, in weight percent of from about 5 to about 15 percent nickel, from about 15 to about 30 percent chromium, about 2.0 percent maximum silicon, from about 5 to about 10 percent tungsten, from about 0.3 to about 0.8 percent carbon, about 1.5 percent maximum manganese, about 3 percent maximum iron, about 0.5 percent maximum zirconium, balance cobalt and impurities.

9. The shroud of claim 8, wherein the first alloy component comprises about 25 weight percent to about 50 weight percent, and the second fraction comprises the balance.

10. The shroud of claim 1, wherein the step of providing a gas turbine engine stationary shroud includes the step of providing a gas turbine engine stationary shroud made of a shroud material comprising a nickel-base superalloy.

11. The shroud of claim 10, wherein the braze repair material is comprised of a mixture of two alloy components, each comprising a weight fraction of the total braze material mixture.

12. The shroud of claim 11, wherein the first alloy component comprises a prealloyed composition, in weight percent, of from about 10 to about 20 percent cobalt, from about 14 to about 25 percent chromium, from about 2 to about 12 percent aluminum, from 0 to about 0.2 percent yttrium, balance nickel and impurities, and the second alloy component comprises a prealloyed composition, in weight percent of from about 10 to about 20 percent cobalt, from about 14 to about 25 percent chromium, from about 2 to about 12 percent aluminum, from about 2 to about 12 percent silicon, balance nickel and impurities.

13. The shroud of claim 12, wherein the first alloy component is from about 55 to about 80 weight percent, and the second alloy component is from about 45 weight percent to about 20 weight percent.

14. The shroud of claim 1, wherein the repair region is a seal tooth of the gas turbine engine stationary shroud.

15. The shroud of claim 1, wherein the step of placing a repair material into the repair region further includes the step of providing the braze repair material as a free-flowing powder.

16. The shroud of claim 1, wherein the step of placing a repair material into the repair region further includes the step of providing the repair material as a sintered compact.

17. An article having a protruding portion extending partially into a flow path surface in a gas turbine engine, the article previously exposed to high temperature operation in the gas turbine engine, the article repaired by the method comprising the steps of:

identifying an undersize dimension of the protruding portion of the article, the undersize dimension being less than a specified minimum service dimension and the undersize dimension being defined at least in part by a flow path surface of the article;

machining the protruding portion to form a non-protruding rub surface;

forming a groove in the non-protruding rub surface extending below the rub surface;

providing a repair element having a protruding portion and an opposite portion configured for insertion into the groove;

providing a braze repair material;

applying the braze repair material to the repair element and to the to the rub surface;

heating the braze repair material and the article to a brazing temperature above the melting temperature of the braze material sufficient to melt at least a portion of the repair material but below the melting temperature of the article and the replacement element; and cooling the braze repair material and the repair region to solidify the braze repair material, the solidified repair material increasing the undersize dimension;

wherein the article comprises a stationary component of a gas turbine engine, and wherein the undersize dimension of the article comprises at least one seal tooth.

18. The article of claim 17, wherein the method further comprises the step of machining the repaired article to yield a repaired article having dimensions appropriate for service in the gas turbine engine.

* * * * *